Oct. 14, 1924.

R. MARTIN 1,511,230

PORTABLE SECONDARY BATTERY

Filed Dec. 22, 1922

Inventor
RALPH MARTIN.
By his Attorney

Patented Oct. 14, 1924.

1,511,230

UNITED STATES PATENT OFFICE.

RALPH MARTIN, OF BROOKLYN, NEW YORK.

PORTABLE SECONDARY BATTERY.

Application filed December 22, 1922. Serial No. 608,537.

*To all whom it may concern:*

Be it known that I, RALPH MARTIN, a citizen of the United States, and a resident of the city of New York, borough of Brooklyn, in the county of Kings and State of New York, have invented certain new and useful Improvements in a Portable Secondary Battery, of which the following is a specification.

Among the principal objects which the present invention has in view are: to facilitate the introduction of electrolyte to the various cells comprising the battery; to economize the space required for transporting the battery; to increase the efficiency of portable batteries; and to simplify and cheapen the construction.

*Drawings.*

*Description.*

Figure 1:
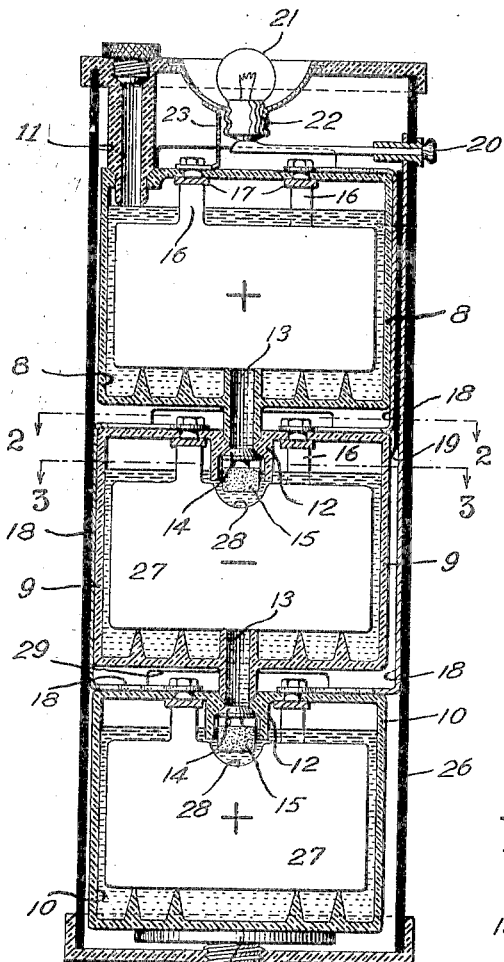
Figure 1 is a vertical section of a portable battery showing the application thereof to a flashlight equipment.

As seen in the drawings the battery when mounted consists of a number of cells 8, 9 and 10.

The cell 8 is distinguished from the other cells mentioned in that it has a perforation to receive the filling tube 11.

The cell 9 has a valve tube 12 which provides seats oppositely disposed, one for the lower end of a connecting tube 13, and the other for a valve 14 mounted at the upper end of a float 15.

The cell 10 is provided with the valve tube 12 to receive the connecting tube 13 and provides seats for the said tube and the valve 14. The cell 10, however, has no connecting tube 13 but is full bottomed.

In every battery there will be one cell 8 and one cell 10. There may be a number of the cells 9 interposed in series between the said cells 8 and 10. All cells are connected in vertical columns or in superposed relation, the idea being that the liquid or electrolyte which is delivered to the uppermost cell 8 through the tube 11 will be in turn transferred to the cells 9 and the cell 10 through the connecting tubes 13. It is obvious that if the valves 14 are not seated that as the electrolyte is delivered to the cells to a depth to overflow the intake end of the tubes 13, the electrolyte will pass to the lowermost cell until the liquid in said cell buoys the float 15 in said cell to seat the valve 14.

It will be observed by reference to Figure 1 of the drawings that the buoyancy of the float 15 closes the valve 14 when the liquid has reached a level below the valve 14 and the seat thereof. When the valve 14 in the cell 10 is seated, the cell 9 begins to fill. This continues until the valve 14 in the cell 9 closes, when the electrolyte begins to accumulate in the cell 8. It will be seen that as the electrolyte in any of the lower cells is dissipated, the liquid from the upper cells replaces it. The need of supply of water or electrolyte to the battery can therefore be determined by the observation of the top cell only, as this cell is the only one of the battery which is not automatically supplied.

Figure 2:
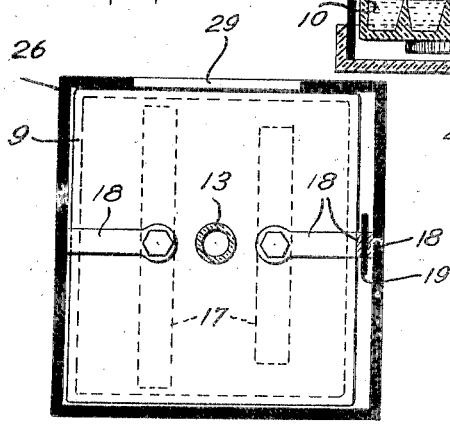
Figure 2 is a cross section of the same, the section being taken on the line 2—2 in Fig. 1.
Figure 3:
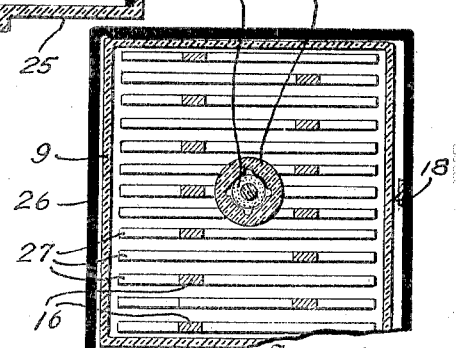
Figure 3 is a cross section taken on the line 3—3, in Fig. 1.

The lugs 16 of the various elements or plates are connected by the bus bars 17 of usual construction, said bars in the various cells being properly connected by jumpers 18 which connect the positive plates of the one cell with the negative plates of the adjacent cell. Care is taken to separate the jumpers 18 from one another, as by the use of an insulating separator 19, best shown in Figures 1 and 2 of the drawings. The jumper 18 of the last or lowermost cell is electrically connected with a push button 20, the extremity whereof engages the central contact of a glow lamp 21 used in the flashlight type of equipment. The socket 22 of the said lamp is connected by means of a short jumper 23 with one of the terminals or bus bars of the uppermost cell. It is obvious that care should be exercised to connect the jumper 23 with the pole of the upper cell opposite to the pole of the lower cell with which the push button 20 is connected.

An elevator screw 24 is suitably mounted in the bottom 25 of the battery casing 26: By means of this screw it will be seen pressure may be applied on the various cells to seat firmly the tapered ends of the tubes 11, 13 and 13 in the respective seats provided therefor in the tubes 12. When using the battery, the push button 20 is pushed in and drawn out in the manner usual with batteries of this character.

The battery plates 27 in the cells such as 9 and 10 having the valves 14, are cut away to form recesses 28 to provide space for the rise and fall of the float 15 when operating to close or open the valves.

Claims.

1. A battery as characterized comprising a plurality of superposed cells, each containing metallic battery elements of opposite potential, and a liquid electrolyte; means for supplying liquid to the lower cells, said means embodying an open connecting tube extending between said cells; and a float therefor disposed in each lower cell for closing said connecting tube and to separate the contents of adjacent cells.

2. A battery as characterized comprising a plurality of cells disposed in superposed relation, each cell being supplied with electrolyte from the cell adjacent thereto and of a higher lever; and float-actuated valves mounted in each cell operable for discontinuing the supply of liquid from the feeding cell.

3. A battery having a plurality of cells equipped with metallic plates of opposite potential, and a liquid electrolyte; means connecting said cells in series for supplying electrolyte progressively from cell to cell; and means for automatically terminating the supply between any two cells, said means embodying a float-actuated valve for shutting off the supply and separating the electrolyte contained in the adjacent cell.

4. In a battery as characterized, a plurality of superposed inter-communicating cells; means floated by the electrolyte in each cell for discontinuing the supply thereof from an adjacent cell; and a plurality of metallic battery plates of opposite potential, said plates being cut away to provide operating space for the flotation means above mentioned.

5. A battery as characterized, comprising a plurality of cells supported one upon the other, means connecting said cells at the centers thereof for transferring a liquid electrolyte from the upper of said cells to the lower thereof, and means for automatically stopping the transfer of the electrolyte when each of said cells has been filled to a predetermined level therein.

6. A battery as characterized, comprising a plurality of cells supported one upon the other, means connecting said cells at the centers thereof for transferring a liquid electrolyte from the upper of said cells to the lower thereof, and means for successively stopping the transfer of the electrolyte when each of said cells has been filled to a predetermined level therein.

7. A battery as characterized, comprising a casing, a plurality of cells nested within said casing one above the other, means for transferring a liquid electrolyte from the upper of said cells to the lower thereof, a filling member connecting the upper of said cells and opening through the top wall of said casing, and means for successively stopping the transfer of the electrolyte when each of said cells has been filled to a predetermined level therein.

RALPH MARTIN.